ated under 35

(12) United States Patent
Sridharan et al.

(10) Patent No.: US 11,163,349 B2
(45) Date of Patent: Nov. 2, 2021

(54) ADAPTIVE POWER OVER ETHERNET POWERING SYSTEM

(71) Applicant: Dell Products L.P., Round Rock, TX (US)

(72) Inventors: Aravind Prasad Sridharan, Tamil Nadu (IN); Vigneshwar Kalyanaraman, Tamil Nadu (IN); Ramesh Ganapathi, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 16/705,722

(22) Filed: Dec. 6, 2019

(65) Prior Publication Data

US 2021/0173461 A1 Jun. 10, 2021

(51) Int. Cl.
*G06F 1/28* (2006.01)

(52) U.S. Cl.
CPC ...................................... *G06F 1/28* (2013.01)

(58) Field of Classification Search
CPC ..... G06F 1/26; G06F 1/28; G06F 1/32; G06F 1/324; G06F 1/329; G06F 1/3228; G06F 1/08; G06F 1/206; G06F 1/3203; G06F 1/3215; G06F 1/3231; G06F 1/3206; G06F 1/3296; G06F 1/3234; G06F 1/3237; G06F 1/3287; G06F 1/266; G06K 15/4055; H04W 52/00; H04W 52/02; Y04S 20/20; Y02D 10/00; H04L 12/10
See application file for complete search history.

(56) References Cited

U.S. PATENT DOCUMENTS

| | | | | |
|---|---|---|---|---|
| 2007/0041387 | A1* | 2/2007 | Ghoshal | H04L 12/10 370/395.52 |
| 2014/0195831 | A1* | 7/2014 | Hamdi | G06F 1/325 713/320 |
| 2016/0062432 | A1* | 3/2016 | Faraz | H04L 12/413 713/300 |
| 2016/0204949 | A1* | 7/2016 | Theunissen | H04L 12/10 307/1 |
| 2018/0278488 | A1* | 9/2018 | Kutty | H04L 41/12 |

\* cited by examiner

*Primary Examiner* — Zahid Choudhury
(74) *Attorney, Agent, or Firm* — Joseph Mencher

(57) ABSTRACT

A Power over Ethernet (PoE) adaptive powering system includes a powered device that identifies a first operating mode in which the powered device is currently operating, determines a first power amount that is required to enable the first operating mode in which the powered device is currently operating, and transmits a first power amount request message that requests the first power amount via a power/data connection. The adaptive PoE powering system also includes a powering device that is connected to the powered device via the power/data connection, and that receives the first power amount request message via the power/data connection, and transmits the first power amount via the power/data connection to the powered device.

20 Claims, 14 Drawing Sheets

ADAPTIVE POWER OVER ETHERNET POWERING SYSTEM

BACKGROUND

The present disclosure relates generally to information handling systems, and more particularly to adaptively providing power via Power over Ethernet (PoE) between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are provided by powering devices and powered devices that utilize Power over Ethernet (PoE) techniques in order transmit or receive power and data via data communication lines such as those provided in Ethernet cables. As would be understood by one of skill in the art, PoE describes any of several standard or ad-hoc systems that pass electrical power along with data via twisted pair Ethernet cabling in order to allow a single cable to provide both a data connection and electrical power to a connected powered device. As such, powering devices such as switch devices may be connected via Ethernet cables to powered devices such as wireless access point devices, Internet Protocol (IP) camera devices, and Voice over IP (VoIP) phone devices, and may operate to transmit both data and power to the powered devices over those Ethernet cables. However, the conventional provisioning of power via PoE techniques from powering devices to powered devices raises some issues.

Conventional PoE techniques provide for the classification of powered devices by a powering device in order to determine an amount of power that will be provided by the powering device to the powered device. For example, when the powered device is connected to the powering device, the powering device may transmit a voltage pulse to the powered device in order to determine how much power the powered device needs, and depending on the amount of current drawn during that voltage pulse, the powering device will classify the powered device into a particular class and will provide that powered device a set or fixed power amount based on that class. As will be appreciated by one of skill in the art, conventional class determinations result in a set/fixed power amount being transmitted by the powering device to the powered device that is the maximum amount of power required for any powered devices having that classification. However, powered devices may include a variety of operating modes that require different power amounts. For example, the VoIP phone devices discussed above may require a first minimum power amount when performing network connection operations, a second minimum power amount when performing idle operations that is higher than the first minimum power amount, a third minimum power amount when performing voice call operations that is higher than the second minimum power amount, a fourth minimum power amount when performing video call operations that is higher than the third minimum power amount, and so on. As such, conventional PoE techniques will provide such VoIP phone devices with a set/fixed power amount that is at least equal to the fourth minimum power amount at all times, thus wasting power available from the powering device when those VoIP phone devices are not performing video call operations.

Accordingly, it would be desirable to provide an adaptive PoE powering system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a powered device engine that is configured to: identify a first operating mode in which a powered device is currently operating; determine a first power amount that is required to enable the first operating mode in which the powered device is currently operating; transmit, via a power/data connection to a powering device, a first power amount request message that requests the first power amount; and receive, from the powering device, the first power amount via the power/data connection.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
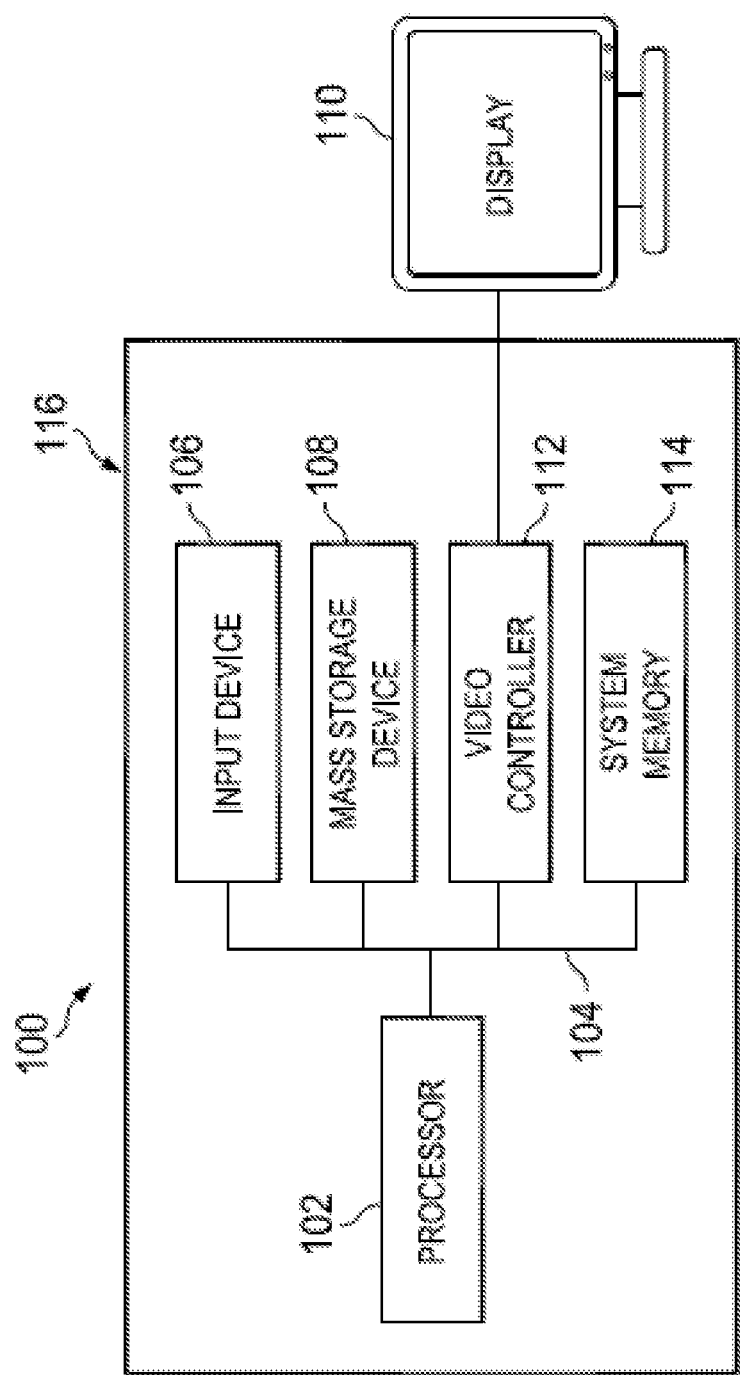
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
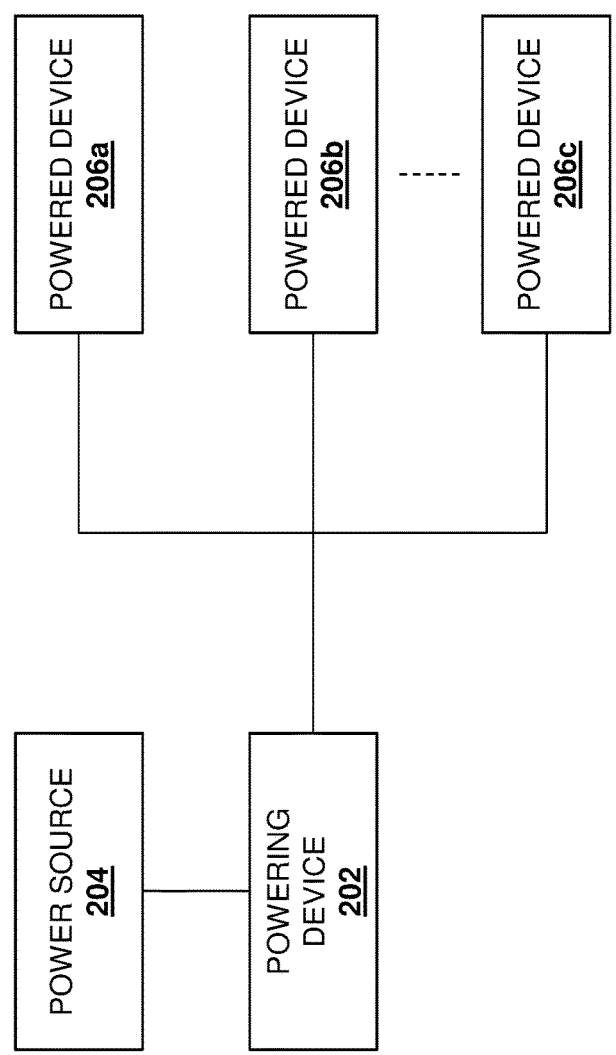
FIG. 2 is a schematic view illustrating an embodiment of an adaptive Power over Ethernet (PoE) powering system.

Referring now to FIG. 2, an embodiment of an adaptive Power over Ethernet (PoE) powering system 200 is illustrated. In the illustrated embodiment, the adaptive PoE powering system 200 incudes a powering device 202. In an embodiment, the powering device 202 may be provided by the IHS 100 discussed above with reference to FIG. 1, and/or may include some or all of the components of the IHS 100, and in specific examples may be provided by a switch device. However, while illustrated and discussed as a switch device, one of skill in the art in possession of the present disclosure will recognize that powering devices provided in the adaptive PoE powering system 200 may include any devices that may be configured to operate similarly as the powering device 202 discussed below. The powering device 202 is coupled to a power source 204, which may be an Alternating Current (AC) power source, a battery power source, and/or any of a variety of power sources that would be apparent to one of skill in the art in possession of the present disclosure. For example, the power source 204 may include a power outlet, with power cabling coupled (e.g., via a power cable plug) to the power outlet, and a power adapter connected to the power cabling and the powering device 202 in order to provide for the transmission of power between the power source 204 and the powering device 202. However, while a specific example of a power source has been described, one of skill in the art in possession of the present disclosure will appreciate that the powering device 202 may receive power in a variety of manners that will fall within the scope of the present disclosure as well.

In the illustrated embodiment, the adaptive PoE powering system 200 also incudes a plurality of powered devices 206*a*, 206*b*, and up to 206*c*. In an embodiment, any or all of the powered devices 206*a*-206*c* may be provided by the IHS 100 discussed above with reference to FIG. 1, and/or may include some or all of the components of the IHS 100, and in specific examples may be provided by wireless access point devices, Internet Protocol (IP) camera devices, Voice over IP (VoIP) phone devices, and/or any other powered devices that would be apparent to one of skill in the art in possession of the present disclosure. However, while illustrated and discussed as being provided by particular devices, one of skill in the art in possession of the present disclosure will recognize that powered devices provided in the PoE powering system 200 may include any devices that may be configured to operate similarly as the powered devices 206*a*-206*c* discussed below. Furthermore, while a specific adaptive PoE powering system 200 has been illustrated and described, one of skill in the art in possession of the present disclosure will recognize that the adaptive PoE powering system of the present disclosure may include a variety of components and component configurations while remaining within the scope of the present disclosure as well.

Figure 3:
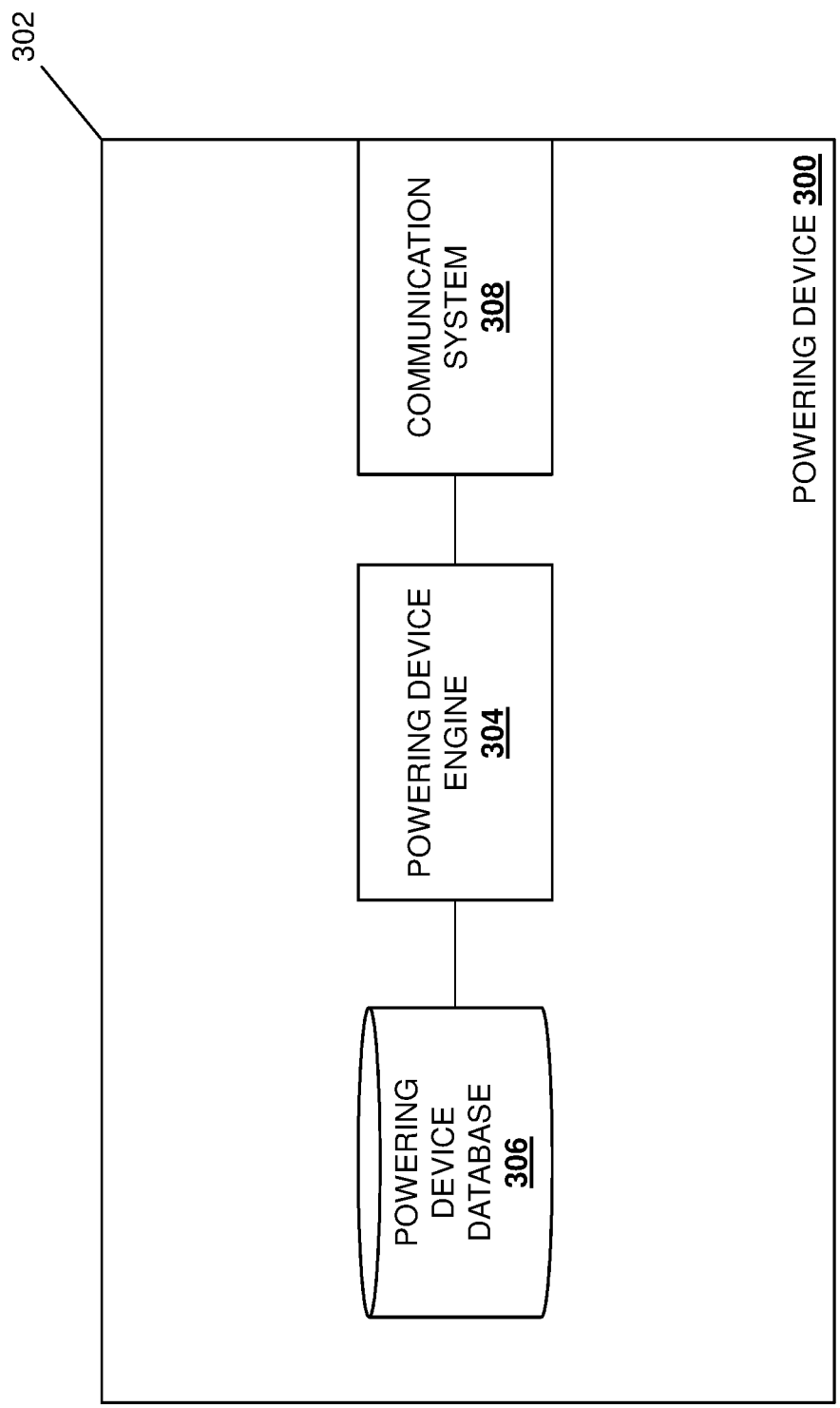
FIG. 3 is a schematic view illustrating an embodiment of a powering device that may be provided in the adaptive PoE powering system of FIG. 2.

Referring now to FIG. 3, an embodiment of a powering device 300 is illustrated that may provide the powering device 202 discussed above with reference to FIG. 2. As such, the powering device 300 may be provided by the IHS 100 discussed above with reference to FIG. 1 and/or may include some or all of the components of the IHS 100, and in specific examples may be provided by a switch device. Furthermore, while illustrated and discussed as a switch device, one of skill in the art in possession of the present disclosure will recognize that the functionality of the powering device 300 discussed below may be provided by other devices that are configured to operate similarly as the powering device 300 discussed below. In the illustrated embodiment, the powering device 300 includes a chassis 302 that houses the components of the powering device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a powering device engine 304 that is configured to perform the functionality of the powering device engines and/or powering devices discussed below.

The chassis 302 may also house a storage system (not illustrated, but which may include the storage 108 discussed above with reference to FIG. 1) that is coupled to the powering device engine 304 (e.g., via a coupling between the storage system and the processing system) and that includes a powering device database 306 that is configured to store any of the information utilized by the powering device engine 304 discussed below. The chassis 302 may also house a communication system 308 that is coupled to the powering device engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific powering device 300 has been illustrated, one of skill in the art in possession of the present disclosure will recognize that powering devices (or other devices operating according to the teachings of the present disclosure in a manner similar to that described below for the powering device 300) may include a variety of components and/or component configurations for providing conventional powering device functionality, as well as the functionality discussed below, while remaining within the scope of the present disclosure as well.

Figure 4:
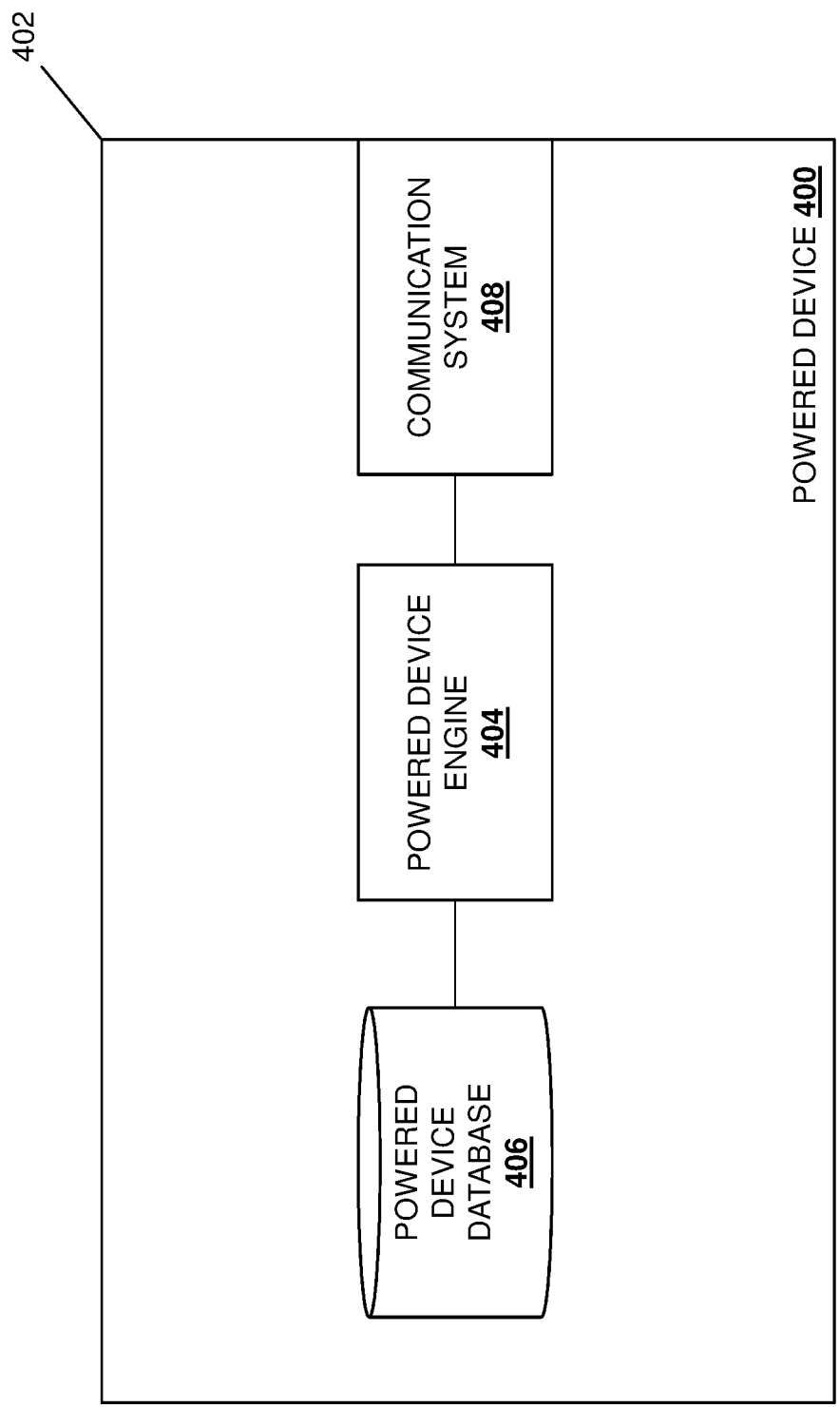
FIG. 4 is a schematic view illustrating an embodiment of a powered device that may be provided in the adaptive PoE powering system of FIG. 2.

Referring now to FIG. 4, an embodiment of a powered device 400 is illustrated that may provide any or all of the powered devices 206a-206c discussed above with reference to FIG. 2. As such, the powered device 400 may be provided by the IHS 100 discussed above with reference to FIG. 1 and/or may include some or all of the components of the IHS 100, and in specific examples may be provided by a wireless access point device, an Internet Protocol (IP) camera device, a Voice over IP (VoIP) phone device, and/or any other powered devices that would be apparent to one of skill in the art in possession of the present disclosure. Furthermore, while illustrated and discussed as being provided by particular devices, one of skill in the art in possession of the present disclosure will recognize that the functionality of the powered device 400 discussed below may be provided by other devices that are configured to operate similarly as the powered device 400 discussed below. In the illustrated embodiment, the powered device 400 includes a chassis 402 that houses the components of the powered device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a powered device engine 404 that is configured to perform the functionality of the powered device engines and/or powered devices discussed below.

The chassis 402 may also house a storage system (not illustrated, but which may include the storage 108 discussed above with reference to FIG. 1) that is coupled to the powered device engine 404 (e.g., via a coupling between the storage system and the processing system) and that includes a powered device database 406 that is configured to store any of the information utilized by the powered device engine 404 discussed below. The chassis 402 may also house a communication system 408 that is coupled to the powered device engine 404 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific powered device 400 has been illustrated, one of skill in the art in possession of the present disclosure will recognize that powering devices (or other devices operating according to the teachings of the present disclosure in a manner similar to that described below for the powered device 400) may include a variety of components and/or component configurations for providing conventional powered device functionality, as well as the functionality discussed below, while remaining within the scope of the present disclosure as well.

Figure 5:
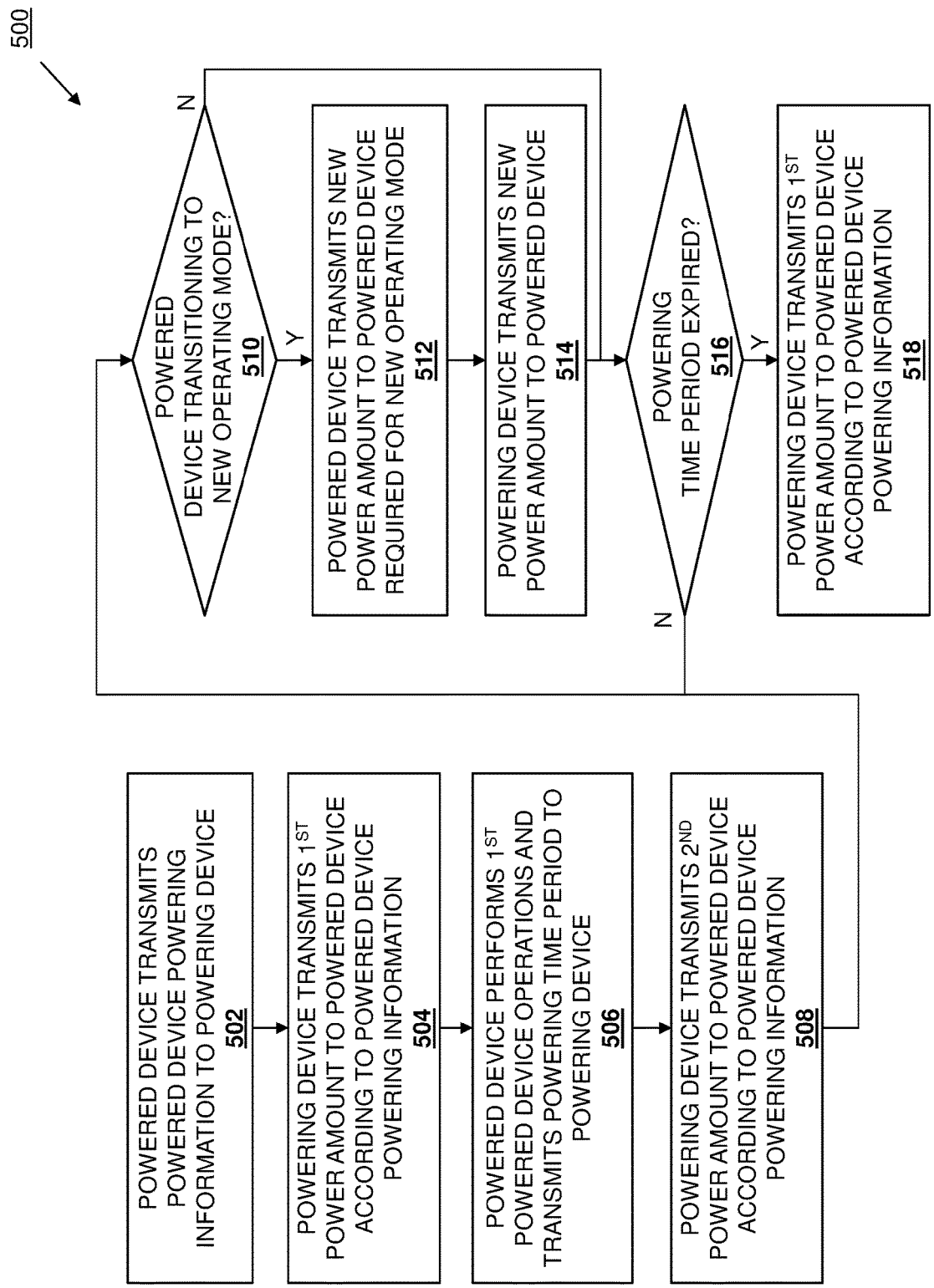
FIG. 5 is a flow chart illustrating an embodiment of a method for adaptive PoE powering.

Referring now to FIG. 5, an embodiment of a method 500 for adaptively providing PoE power is illustrated. As discussed below, the systems and methods of the present disclosure provide for the provisioning of adaptive PoE power between a powering device and a powered device. For example, upon connection of the powering device and the powered device via a power/data connection (e.g., provided by an Ethernet cable) and their subsequent initialization, the powered device may transmit powered device powering information to the powering device that may include a "minimum power operation" power amount that is required to allow for minimum power operations such as network connection and setup by the powered device, a "low power operation" power amount that is required to allow for relatively low power operations by the powered device, and a "maximum power operation" power amount that is required for the highest power operations that will be performed by the powered device. In response to receiving the powered device powering information, the powering device may operate to provide the "minimum power operation" power amount to the powered device via the power/data connection, which allows the powered device to perform the network connection and setup operations, as well as transmit a powering time period to the powering device. Following the receiving of the powering time period, the powering device may operate to provide the "low power operation" power amount to the powered device, which may allow the powered device to perform idle operations and/or other relatively low power operations.

Subsequently, when the powered device detects that it is transitioning into a new operating mode that requires a new/different/higher power amount in order to allow the powered device to perform the associated operations, the powered device may identify the new/different/higher power amount to the powering device and, in response, the powering device may operate to provide that new/different/higher power amount to the powered device. The systems and methods of the present disclosure may then continue to monitor and determine when its current operating mode transitions to a new operating mode, and request "real-time" new/different/higher/lower power amounts that it requires to perform the operations associated with those new operating modes such that the powering device provides real-time power amounts to the powered device that are required to allow for its current operating mode. This may continue until the powering time period expires, after which the powering device may operate to provide the "minimum power operation" power amount to the powered device. As such, power available to the powering device is efficiently provided to powered devices based on the real-time needs of those powered devices to operate in their current operating modes, thus conserving power, allowing more powered devices to be powered by the powering device, and/or providing other benefits that would be apparent to one of skill in the art in possession of the present disclosure.

Figure 6A:
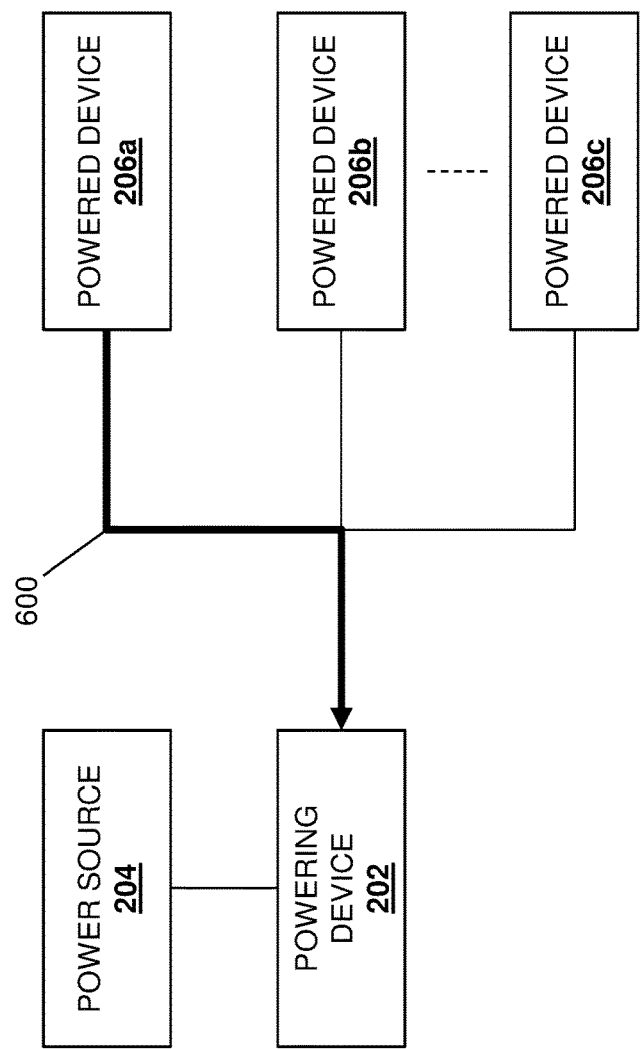
FIG. 6A is a schematic view illustrating an embodiment of the adaptive PoE powering system of FIG. 2 operating during the method of FIG. 5.

The method 500 begins at block 502 where a powered device transmits powered device powering information to a powering device. In an embodiment, at or prior to the method 500, the powering device 202 may be connected to each of the powered devices 206a-206c via respective power/data connections that, as discussed above, may be provided by respective Ethernet cables. However, while the powering device 202 is discussed as powering the powered devices 206a-206c via PoE techniques and components, one of skill in the art in possession of the present disclosure will appreciate that the powering device 202 may power the powered devices 206a-206c using other powering techniques while remaining within the scope of the present disclosure as well. As such, following the connections of the powering device 202 and the powered devices 206a-206c, the powering device 202 and/or the powered devices 206a-206c may be initialized and may perform a variety of device and/or PoE initialization operations known in the art. With reference to FIG. 6A, in an embodiment of block 502 and subsequent to (or as part of) those initialization operations, the powered device engine 404 in the powered device 206a/400 may operate on some initial power amount received from the powering device 202/400 to generate and transmit powered device powering information 600 via its communication system 408 and over the power/data connection (e.g., an Ethernet cable) to the powering device 202/300, and the powering device engine 304 in the powering device 202/300 may receive that powered device powering information 600 via its communication system 408. For example, the powered device powering information 600 may be provided in one or more Type-Length-Value (TLV) structures in a Link Layer Discovery Packet (LLDP) message, although other techniques for transmitted the powered device powering information 600 are envisioned as falling within the scope of the present disclosure as well.

In a specific example, the powered device 206a/400 may be a VoIP phone device that is configured to operate in a minimum power operating mode to perform minimum power operations such as network connection and setup that require a "minimum power operation" power amount (e.g., ~4 watts), a low power operating mode to perform relatively low power operations such as idle operations that require a "low power operation" power amount (e.g., ~10 watts), a highest power operating mode to perform its highest power operations such as video call operations that require a "maximum power operation" power amount (e.g., ~30 watts), as well as one or more intermediate power operating modes to perform intermediate power operations such as voice call operations that require an "intermediate power operation" power amount (e.g., ~20 watts). However, while a specific device with specific operating modes is described, one of skill in the art in possession of the present disclosure will appreciate that the powered devices 206a, 206b, and up to 206c may be provided by a variety of powered devices with a variety of operating modes while remaining within the scope of the present disclosure. Furthermore, while only the powered device 206a is explicitly discussed as performing the functionality below, one of skill in the art in possession of the present disclosure will appreciate that the powered devices 206b and up to 206c may also operate in a similar manner while remaining within the scope of the present disclosure as well.

Thus, using the specific examples provided above, the powered device 206a/400 may generate and transmit an LLDP message that incudes the powered device powering information 600, with the "minimum power operation" power amount (e.g., ~4 watts) identified in a TLV structure in that LLDP message, a "low power operation" power amount (e.g., ~10 watts) identified in a TLV structure in that LLDP message, and a "maximum power operation" power amount (e.g., ~30 watts) identified in a TLV structure in that LLDP message. As discussed above, the other powered devices 206b and up to 206c may transmit similar LLDP messages with their "minimum power operation" power amount, "low power operation" power amount, and "maximum power operation" power amount in a substantially similar manner.

Figure 6B:
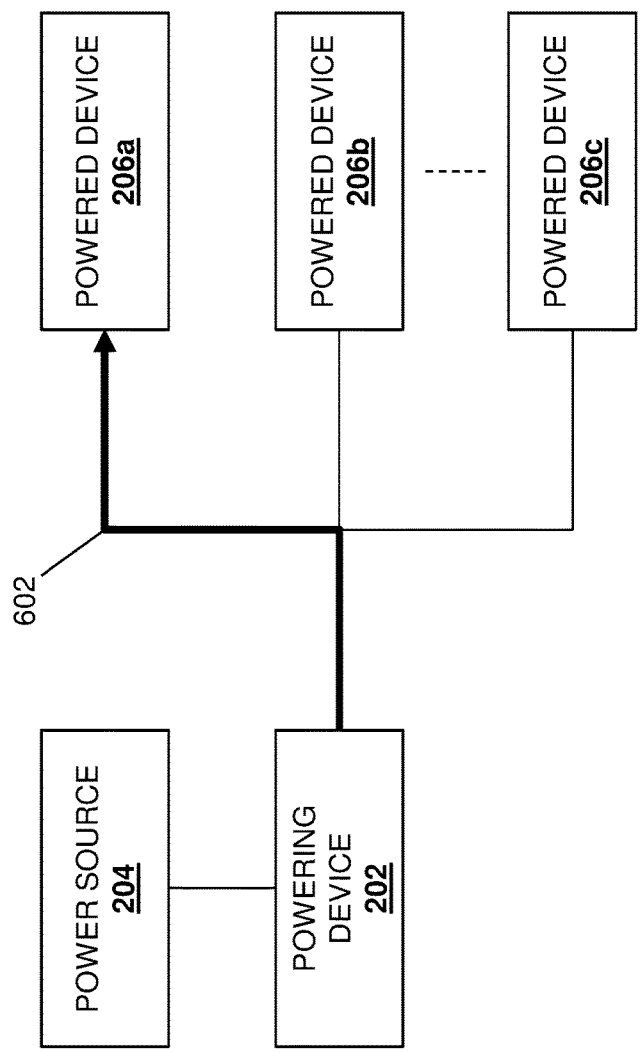
FIG. 6B is a schematic view illustrating an embodiment of the adaptive PoE powering system of FIG. 2 operating during the method of FIG. 5.

The method 500 then proceeds to block 504 where the powering device transmits a first power amount to the powered device according to the powered device powering information. With reference to FIG. 6B, in an embodiment of block 504 and in response to receiving the powered device powering information, the powering device engine 404 in the powering device 202/400 may operate to provide a first power amount 602 identified in that powered device powering information over the power/data connection (e.g., an Ethernet cable) to the powered device 206a/400. Continuing with the specific example discussed above, at block 504 the powering device engine 404 in the powering device 202/400 may operate to provide the "minimum power operation" power amount (e.g., ~4 watts) identified in the powered device powering information 600 to the powered device 206a/400. While not described in detail herein, one of skill in the art in possession of the present disclosure will recognize how the powering device 202 may provide particular power amounts from the power received from the power source 204 to the powering device 206a using a variety of power receiving/transmitting techniques (e.g., PoE power receiving/transmitting techniques) known in the art. Furthermore, while a particular power amount is described as being provided by the powering device 202/300 to the powered device 206a/400 at block 504, one of skill in the art in possession of the present disclosure will recognize that a relatively tight range of power (e.g., ~3.8-~4.2 watts in this example) may be provided while remaining within the scope of the present disclosure as well. Continuing with the specific example provided above, the "minimum power operation" power amount (e.g., ~4 watts) provided by the powering device 202/300 to the powered device 206a/400 may be a power amount that is sufficient to allow the powered device 206a/400 to perform network connection and setup operations, a specific example of which is discussed in further detail below.

Figure 6C:
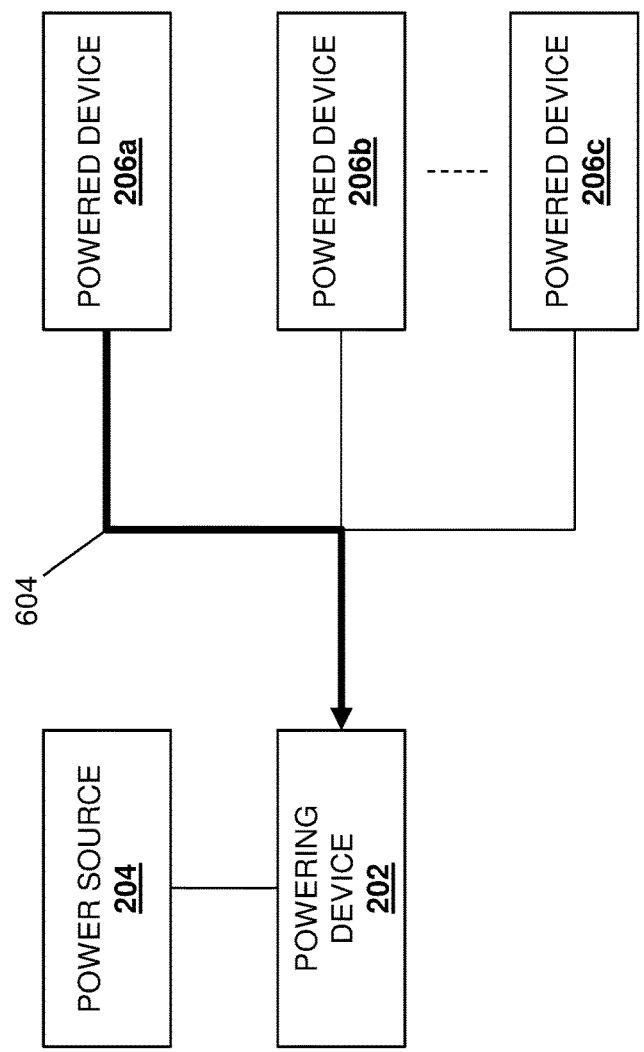
FIG. 6C is a schematic view illustrating an embodiment of the adaptive PoE powering system of FIG. 2 operating during the method of FIG. 5.

The method 500 then proceeds to block 506 where the powered device performs first powered device operations and transmits a powering time period to the powering device. In an embodiment, at block 506, the powered device engine 404 in the powered device 206a/400 may operate on the first power amount received from the powering device 202/300 to perform first powered device operations that include transmitting a powering time period 604 to the powering device 202/300 via its communication system 408 and over the power/data connection (e.g., an Ethernet cable) such that the powering time period 604 is received by the powering device 202/300 via its communication system 308, as illustrated in FIG. 6C. In a specific example, the powering time period 604 may be provided in a TLV structure in a LLDP message, although other techniques for transmitted the powering time period are envisioned as falling within the scope of the present disclosure as well. Continuing with the example above, the powered device engine 404 in the powered device 206a/400 may operate on the "minimum power operation" power amount received from the powering device 202/300 to perform network connection and setup operations that include transmitting the powering time period 604 to the powering device 202/300. For example, the network connection and setup operations performed by the powered device 206a/400 at block 506 may include Dynamic Host Configuration Protocol (DHCP) operations that may involve the powered device 206a/400 retrieving an Internet Protocol (IP) address, retrieving a DHCP lease time value, and/or performing other DHCP operations that would be apparent to one of skill in the art in possession of the present disclosure. However, while specific network connection and setup operations have been described, one of skill in the art in possession of the present disclosure will appreciate that other first powered device operations may be performed while remaining within the scope of the present disclosure as well.

As discussed in further detail below, the powering time period 604 transmitted by the powered device 206a/400 to the powering device 202/300 may be a time period that the powered device 206a/400 is requesting that the powering device 202/300 guarantee it will provide power to the powered device 206a/400. As such, the powered device 206a/400 may request guaranteed power for a time period that it expects to operate for (e.g., 1 hour), or may request indefinite power if it does not expect to cease operation (e.g., an infinite powering time period.) However, one of skill in the art in possession of the present disclosure will appreciate that other powering time periods may be defined differently while remaining within the scope of the present disclosure as well. In a specific example, at block 506 the powered device engine 404 in the powered device 206a/400 may provide the DHCP lease time value that was retrieved during the DHCP operations discussed above as the powering time period 604, although one of skill in the art in possession of the present disclosure will appreciate that the powering time period may be selected in other manners while remaining within the scope of the present disclosure as well.

Figure 6D:
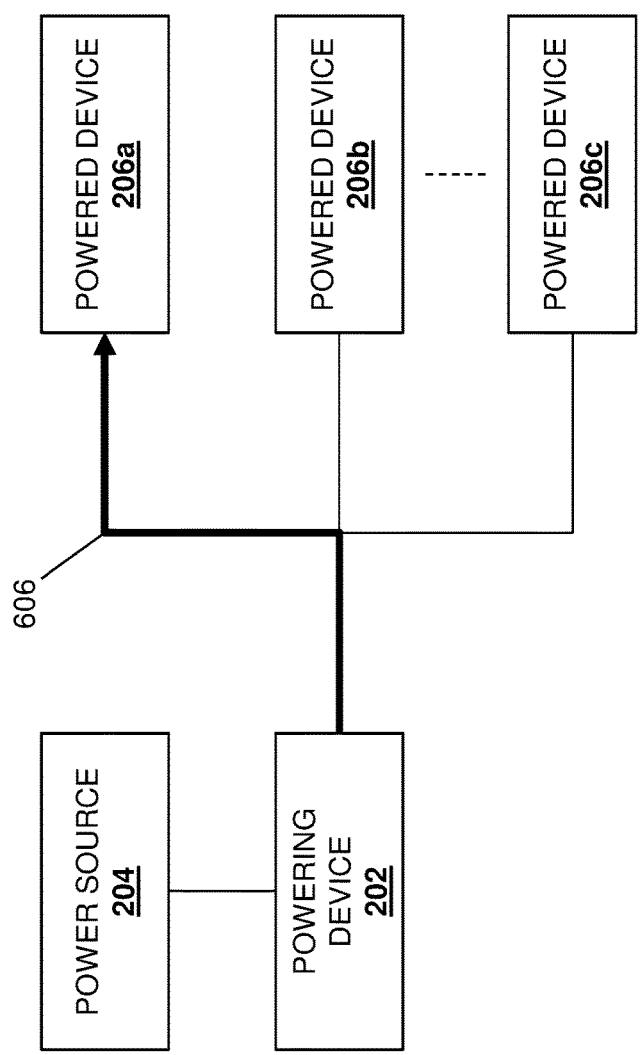
FIG. 6D is a schematic view illustrating an embodiment of the adaptive PoE powering system of FIG. 2 operating during the method of FIG. 5.

The method 500 then proceeds to block 508 where the powering device transmits a second power amount to the powered device according to the powered device powering information. With reference to FIG. 6D, in an embodiment of block 508 and in response to receiving the powering time period, the powering device engine 304 in the powering device 202/300 may operate to provide a second power amount 606 over the power/data connection (e.g., an Ethernet cable) to the powered device 206a. Continuing with the specific example provided above, the receiving of the powering time period by the powering device engine 304 in the powering device 202/300 may indicate that the powered device 206a/400 is ready to begin "low power operations" and, in response, at block 508 the powering device engine 304 in the powering device 202/300 may operate to provide the "low power operation" power amount (e.g., ~10 watts) identified in the powered device powering information over the power/data connection (e.g., an Ethernet cable) to the powered device 206a. For example, as discussed above, the "low power operation" power amount may be sufficient to allow the powered device 206a/400 to perform relatively low power operations such as idle operations and, as such, block 508 may allow for those low power operations by the powered device 206a/400. Furthermore, while a particular power amount is described as being provided by the powering device 202/300 to the powered device 206a/400 at block 508, one of skill in the art in possession of the present disclosure will recognize that a relatively tight range of power (e.g., ~9.8-~10.2 watts in this example) may be provided while remaining within the scope of the present disclosure as well.

The method 500 then proceeds to decision block 510 where it is determined whether the powered device is transitioning to a new operating mode. In an embodiment, at decision block 510, the powered device engine 404 in the powered device 206a/400 may operate to monitor its operation to determine whether it is transitioning to a new operating mode. As discussed in the specific examples provided above, the powered device may be a VoIP phone device that is configured to operate in a low power operating mode in which idle operations are performed, an intermediate power operating mode in which voice call operations are performed, and a highest power operating mode in which video call operations are performed. As such, the powered device engine 404 in the powered device 206a/400 may operate at decision block 510 to determine whether it is transitioning between any of its low power operating mode, intermediate power operating mode, and highest power operating mode. However, while specific examples are provided, one of skill in the art in possession of the present disclosure will appreciate that powered devices may monitor for the transition between a variety of operating modes that will fall within the scope of the present disclosure as well.

Figure 6E:
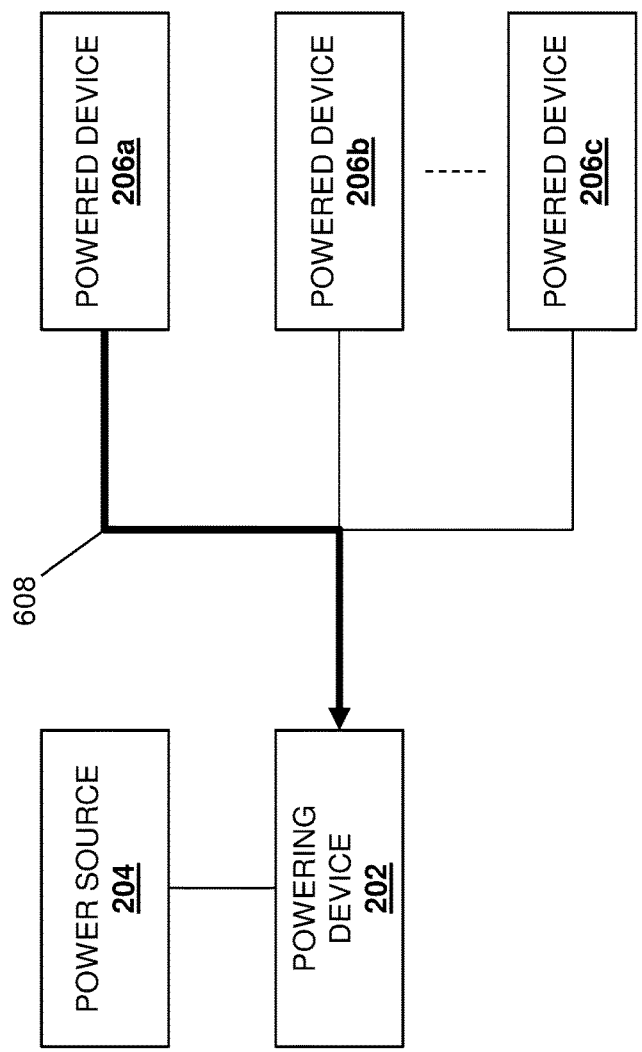
FIG. 6E is a schematic view illustrating an embodiment of the adaptive PoE powering system of FIG. 2 operating during the method of FIG. 5.

If, at decision block 510, it is determined that the powered device is transitioning to a new operating mode, the method 500 proceeds to block 512 where the powered device transmits a new power amount to the powered device that is required for the new operating mode. In an embodiment, at block 512 and in response to determining that the powered device is transitioning to a new operating mode at decision block 510, the powered device engine 404 in the powered device 206a/400 may operate to identify a new power amount required for that new operating mode, and transmit that new power amount 608 via its communication system 408 and over the power/data connection (e.g., an Ethernet cable) such that it is received by the powering device engine 304 in the powering device 202/300 via its communication system 308, as illustrated in FIG. 6E. In a specific example, the new power amount 608 may be provided in a TLV structure in a LLDP message, although other techniques for transmitted the powering time period are envisioned as falling within the scope of the present disclosure as well.

Continuing with the specific example discussed above in which the powered device 206a/400 is a VoIP phone device, at decision block 510 the powered device engine 404 in the powered device 206a/400 may determine that the powered device 206a/400 is transitioning from the low power operating mode (e.g., idle operations) to the intermediate power operating mode (e.g., voice call operations) based on, for example, one or more commands or actions performed by a user of the powered device 206a/400 (e.g., the user initiating a voice call.) In response, the powered device engine 404 in the powered device 206a/400 may operate to determine that the "intermediate power operation" power amount that is required to allow the powered device 206a/400 to operate in the intermediate power operating mode. The powered device engine 404 in the powered device 206a/400 may then generate a LLDP message including the "intermediate power operation" power amount in a TLV structure, and transmit that LLDP message via its communication system 408 and over the power/data connection (e.g., an Ethernet cable) such that it is received by the powered device engine 304 in the powered device 202/300 via its communication system 308.

Figure 6F:
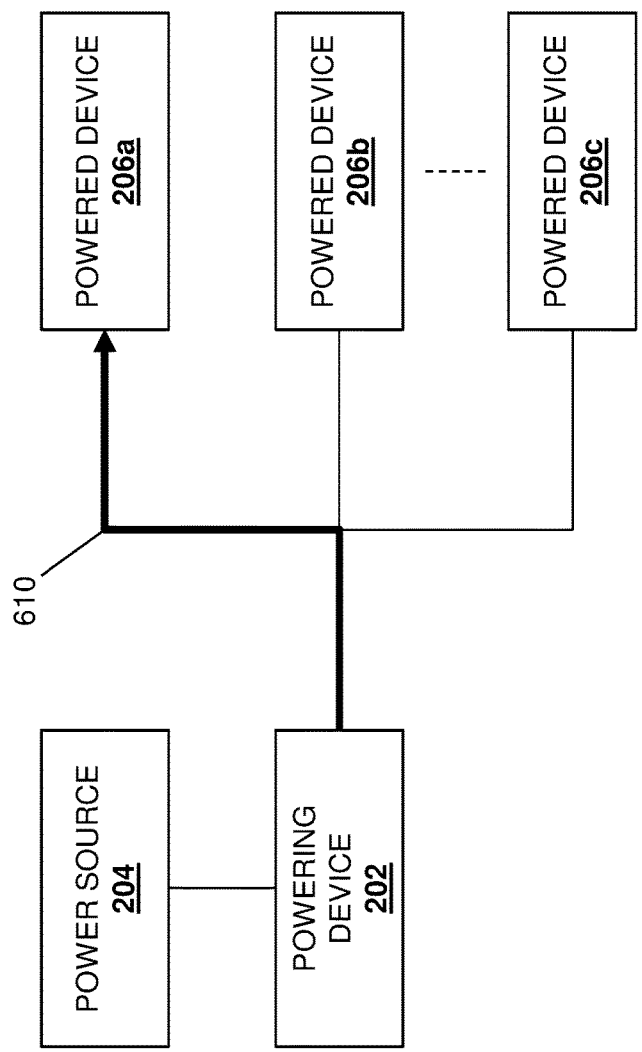
FIG. 6F is a schematic view illustrating an embodiment of the adaptive PoE powering system of FIG. 2 operating during the method of FIG. 5.

The method 500 then proceeds to block 514 where the powering device transmits the new power amount to the powered device. With reference to FIG. 6F, in an embodiment of block 514 and in response to receiving the new power amount from the powered device 206a/400, the powering device engine 304 in the powering device 202/300 may operate to provide the new power amount 610 over the power/data connection (e.g., an Ethernet cable) to the powered device 206a. Continuing with the specific example provided above, the receiving of the new power amount 608 by the powering device engine 304 in the powering device 202/300 may indicate that the powered device 206a/400 is transitioning to "intermediate power operations" (e.g., voice call operations) and, in response, at block 514 the powering device engine 304 in the powering device 202/300 may operate to provide the "intermediate power operation" power amount (e.g., ~20 watts) identified in the by the powered device 206a/400 over the power/data connection (e.g., an Ethernet cable) to the powered device 206a. For example, as discussed above, the "intermediate power operation" power amount may be sufficient to allow the powered device 206a/400 to perform intermediate power operations such as voice call operations and, as such, block 514 may allow for those intermediate power operations by the powered device 206a/400. Furthermore, while a particular power amount is described as being provided by the powering device 202/300 to the powered device 206a/400 at block 514, one of skill in the art in possession of the present disclosure will recognize that a relatively tight range of power (e.g., ~19.8-~20.2 watts in this example) may be provided while remaining within the scope of the present disclosure as well.

If, at decision block 510, it is determined that the powered device is not transitioning to a new operating mode, or following block 514, the method 500 proceeds to decision block 516 where it is determined whether the powering time period has expired. In an embodiment, at decision block 516, the powering device engine 304 in the powering device 202/300 may operate to determine whether the powering time period received from the powered device 206a/400 at block 506 has expired. As will be appreciated by one of skill in the art in possession of the present disclosure, in some embodiments the powering device engine 304 in the powering device 202/300 may operate to begin a timer in response to receiving the powering time period at block 506, and may periodically check that timer to determine whether the powering time period has expired. As such, while illustrated as being performed at decision block 516, the determination of whether the powering time period has expired may be performed at any time during the method 500 while remaining within the scope of the present disclosure as well.

If, at decision block 516, it is determined that the powering time period has not expired, the method 500 may return to decision block 510. As such, the method 500 may loop through blocks 510, 512, 514, and 516 as long as the powering time period has not expired, which one of skill in the art in possession of the present disclosure will recognize allows the powering device 202/300 to continue to provide a required power amount to the powered device 206a/400 for a particular operating mode being performed by that powered device as long as the powered device remains in that particular operating mode and the powering time period has not expired, while providing different required power amount(s) to the powered device 206a/400 when it transitions to different operating mode(s) as long as the powering time period has not expired.

Figure 6G:
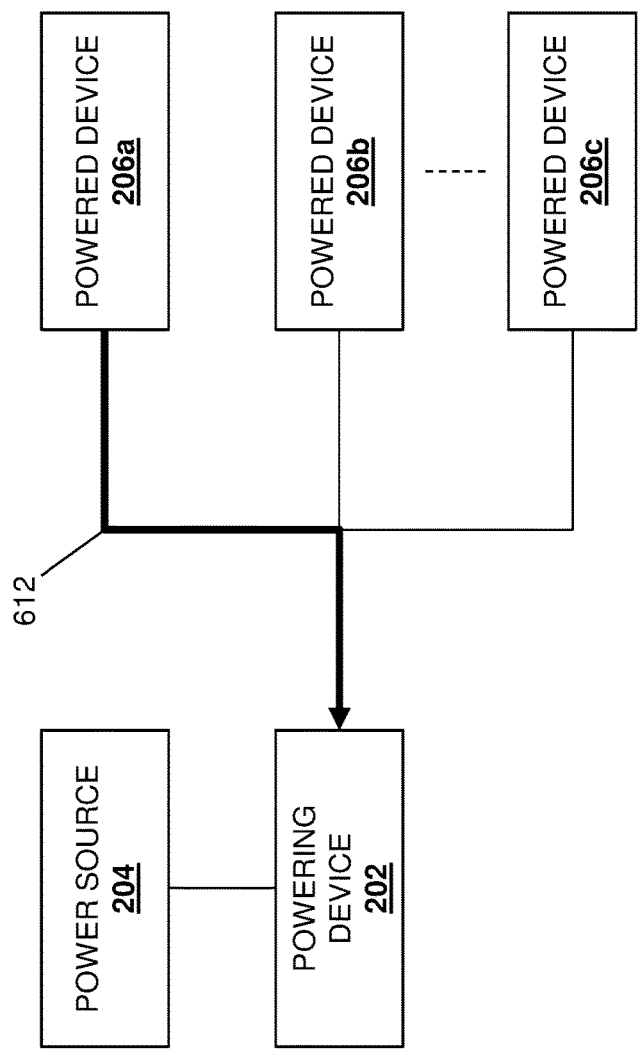
FIG. 6G is a schematic view illustrating an embodiment of the adaptive PoE powering system of FIG. 2 operating during the method of FIG. 5.

As such, in a specific example, if during another iteration of decision block 510 it is determined that the powered device is transitioning to a new operating mode (with the previous "new operating mode" identified in the previous iteration of the method 500 now being considered a "current operating mode" in the current iteration of the method 500), the method 500 proceeds to another iteration of block 512 where the powered device transmits a new power amount to the powered device that is required for the new operating mode. Similarly as discussed above, at block 512 and in response to determining that the powered device is transitioning to a new operating mode at decision block 510, the powered device engine 404 in the powered device 206a/400 may operate to identify a new power amount required for that new operating mode, and transmit that new power amount 612 via its communication system 408 and over the power/data connection (e.g., an Ethernet cable) such that it is received by the powering device engine 304 in the powering device 202/300 via its communication system 308, as illustrated in FIG. 6G. In a specific example, the new power amount 612 may be provided in a TLV structure in a LLDP message, although other techniques for transmitted the powering time period are envisioned as falling within the scope of the present disclosure as well.

Continuing with the specific example discussed above in which the powered device 206a/400 is a VoIP phone device, at decision block 510 the powered device engine 404 in the powered device 206a/400 may determine that the powered device 206a/400 is transitioning from the intermediate power operating mode (e.g., voice call operations) to the highest power operating mode (e.g., video call operations) based on, for example, one or more commands or actions performed by a user of the powered device 206a/400 (e.g., a user initiating a video call.) In response, the powered device engine 404 in the powered device 206a/400 may operate to determine that the "highest power operation" power amount that is required to allow the powered device 206a/400 to operate in the highest power operating mode. The powered device engine 404 in the powered device 206a/400 may then generate a LLDP message including the "highest power operation" power amount in a TLV structure, and transmit that LLDP message via its communication system 408 and over the power/data connection (e.g., an Ethernet cable) such that it is received by the powered device engine 304 in the powered device 202/300 via its communication system 308.

Figure 6H:
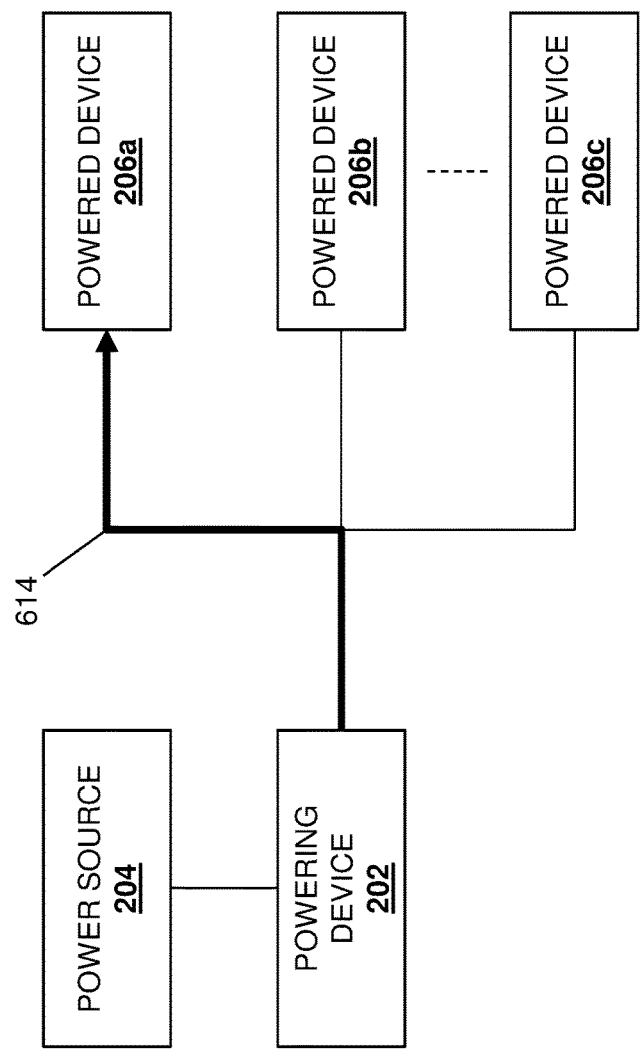
FIG. 6H is a schematic view illustrating an embodiment of the adaptive PoE powering system of FIG. 2 operating during the method of FIG. 5.

The method 500 then proceeds to another iteration of block 514 where the powering device transmits the new power amount to the powered device. With reference to FIG. 6H, in an embodiment of block 514 and in response to receiving the new power amount from the powered device 206a/400, the powering device engine 304 in the powering device 202/300 may operate to provide the new power amount 614 over the power/data connection (e.g., an Ethernet cable) to the powered device 206a. Continuing with the specific example provided above, the receiving of the new power amount 612 by the powering device engine 304 in the powering device 202/300 may indicate that the powered device 206a/400 is transitioning to "highest power operations" (e.g., video call operations) and, in response, at block 514 the powering device engine 304 in the powering device 202/300 may operate to provide the "highest power operation" power amount (e.g., ~30 watts) identified in the by the powered device 206a/400 over the power/data connection (e.g., an Ethernet cable) to the powered device 206a. For example, as discussed above, the "highest power operation" power amount may be sufficient to allow the powered device 206a/400 to perform highest power operations such as video call operations and, as such, block 514 may allow for those highest power operations by the powered device 206a/400. Furthermore, while a particular power amount is described as being provided by the powering device 202/300 to the powered device 206a/400 at this iteration of block 514, one of skill in the art in possession of the present disclosure will recognize that a relatively tight range of power (e.g., ~29.8-~30.2 watts in this example) may be provided while remaining within the scope of the present disclosure as well.

As such, the method 500 may loop through blocks 510, 512, 514, and 516 as long as the powering time period has not expired to increase and decrease the power amount being provided by the powering device 202/300 to the powered device 206a/400 based on requests from the powered device 206a/400 as it transitions between different operating modes, which enables the provision of power amounts from the powering device 202/300 to the powered device 206a/400 based on the real-time power requirements of the powered device 206a/400 that allow it to perform operations according to a real-time/current operating mode of that powered device 206a/400. For example, following the ending of voice call or video call operations, the powered device 206a/400 provided by a VoIP phone device may enter idle operations, which may cause the powered device engine 404 in the powered device 206a/400 to request the associated "low power operation" power amount (e.g., ~10 watts), and the powering device engine 304 in the powering device 202/300 to provide that "low power operation" power amount to the powered device 206a/400.

Figure 6I:
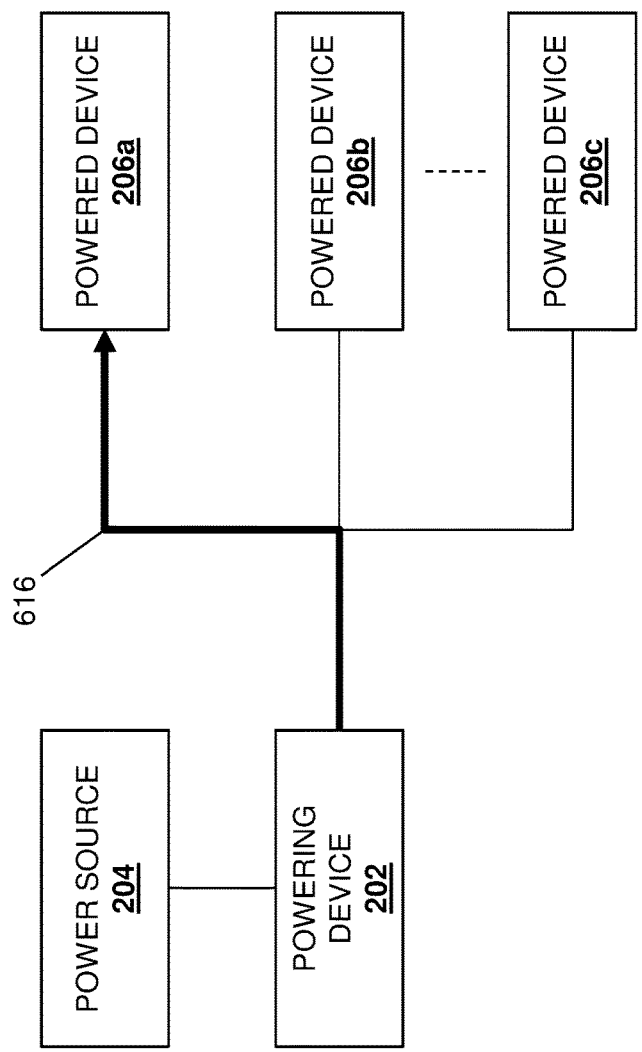
FIG. 6I is a schematic view illustrating an embodiment of the adaptive PoE powering system of FIG. 2 operating during the method of FIG. 5.

If, at decision block 516, it is determined that the powering time period has expired, the method 500 proceeds to block 518 where the powering device transits the first power amount to the powered device according to the powered device powering information. With reference to FIG. 6I, in an embodiment of block 518 and in response to determining that the powering time period has expired at decision block 516, the powering device engine 304 in the powering device 202/300 may operate to provide a first power amount 616 identified in the powered device powering information over the power/data connection (e.g., an Ethernet cable) to the powered device 206a/400. Continuing with the specific example discussed above, at block 518 the powering device engine 404 in the powering device 202/400 may operate to provide the "minimum power operation" power amount (e.g., ~4 watts) identified in the powered device powering information 600 to the powered device 206a/400. Furthermore, while a particular power amount is described as being provided by the powering device 202/300 to the powered device 206a/400 at block 518, one of skill in the art in possession of the present disclosure will recognize that a relatively tight range of power (e.g., ~3.8-~4.2 watts in this example) may be provided while remaining within the scope of the present disclosure as well. As discussed above, the "minimum power operation" power amount (e.g., ~4 watts) provided by the powering device 202/300 to the powered device 206a/400 may be a power amount that is sufficient to allow the powered device 206a/400 to perform network connection and setup operations. As such, block 518 may be performed when the use of the powered device 206a/400 is finished, and may requires any subsequent use of the powered device 206a/400 to be accompanies by network connection and setup operations. As discussed above, for powered devices subject to regular/reoccurring use, the powering time period may be set to infinity to ensure that those powered devices are always provided at least the "low power operation" power amount that enables low power operations (e.g., idle operations.)

Thus, systems and methods have been described that provide adaptive PoE power from a powering device to a powered device. For example, upon connection of the powering device and the powered device via a power/data connection (e.g., provided by an Ethernet cable) and their subsequent initialization, the powered device may transmit powered device powering information to the powering device that may include a "minimum power operation" power amount that is required for network connection and setup by the powered device, a "low power operation" power amount that is required to allow for relatively low power operations by the powered device, and a "maximum power operation" power amount that is required for the highest power operations that will be performed by the powered device. The powering device may then operate to provide the "minimum power operation" power amount to the powered device via the power/data connection, which allows the powered device to perform the network connection and setup operations and transmit a powering time period to the powering device. Following the receiving of the powering time period, the powering device may operate to provide the "low power operation" power amount to the powered device, which may allow the powered device to idle and/or perform other relatively low power operations.

Subsequently, whenever the powered device detects that it is transitioning into a new operating mode that requires a new/different/higher power amount in order to allow the powered device to perform the associated operations, the powered device may identify the new/different/higher power amount to the powering device and, in response, the powering device operate to provide that new/different/higher power amount to the powered device. The systems and methods of the present disclosure may then continue to monitor and determine when its current operating mode transitions to a new operating mode, and request "real-time" new/different/higher/lower power amounts that it requires to perform the operations associated with those new operating modes such that the powering device provides real-time power amounts to the powered device that are required by its current operating modes. This may continue until the powering time period expires, after which the powering device may operate to provide the "minimum power operation" power amount to the powered device. As such, power available to the powering device is efficiently provided to powered devices based on the real-time needs of those powered devices to operate in their current operating modes, thus conserving power, allowing more powered devices to be powered by the powering device, and/or providing other benefits that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Power over Ethernet (PoE) adaptive powering system, comprising:
a powered device that is configured to:
transmit, via a power/data connection, powered device powering information that identifies a plurality of operating modes for the powered device and a respective power amount for each of the plurality of operating modes;
receive, via the power/data connection, a minimum power amount that is associated with a minimum power operation of the plurality of operating modes included in the powered device information;
identify, subsequent to the receiving the minimum power amount, a first operating mode that is included in the plurality of operating modes and in which the powered device is currently operating;
determine a first power amount that is required to enable the first operating mode in which the powered device is currently operating; and
transmit a first power amount request message that requests the first power amount via the power/data connection; and
a powering device that is connected to the powered device via the power/data connection, wherein the powering device is configured to:
receive the powered device powering information;
transmit a minimum power amount that is associated with a minimum power operation of the plurality of operating modes included in the powered device information;
receive the first power amount request message via the power/data connection; and
determine that the first power amount is within a power amount associated with an operating mode included in the plurality of operating modes and, in response, transmit the first power amount via the power/data connection to the powered device.

2. The system of claim 1, wherein the powered device is configured to:
identify a second operating mode to which the powered device has transitioned to from the first operating mode;
determine a second power amount that is required to enable the second operating mode to which the powered device has transitioned to from the first operating mode, wherein the second power amount is different from the first power amount; and
transmit a second power amount request message that requests the second power amount via the power/data connection, and wherein the powering device is configured to:
receive the second power amount request message via the power/data connection; and
determine that the second power amount is within a power amount associated with an operating mode included in the plurality of operating modes and, in response, transmit the second power amount via the power/data connection to the powered device.

3. The system of claim 1, wherein the powered device powering information is transmitted prior to identifying the first operating mode in which the powered device is currently operating and subsequent to the powered device being connected to the powering device via the power/data connection, and wherein the powered device powering information includes a second power amount that is required by the powered device for second powered device operations, and a third power amount that is required by the powered device for third powered device operations and that is higher than the second power amount.

4. The system of claim 1, wherein
the minimum power amount that is associated with the minimum power operation of the plurality of operating modes included in the powered device information is transmitted prior to receiving the first power amount request message and transmitting the first power amount via the power/data connection to the powered device, and wherein the minimum power amount allows the powered device to perform the minimum power operations that include network connection operations.

5. The system of claim 3, wherein the powered device is configured, prior to identifying the first operating mode in which the powered device is currently operating, to:
identify, to the powering device via the power/data connection and subsequent to being connected to the powering device via the power/data connection, a powering time period.

6. The system of claim 5, wherein the powering device is configured to:
receive the identification of the powering time period via the power/data connection from the powered device; and
transmit, in response to determining that the time period has ended, the second power amount via the power/data connection to the powered device.

7. The system of claim 1, wherein the first power amount request message is a Link Layer Discovery Protocol (LLDP) message.

8. An Information Handling System (IHS), comprising:
a processing system; and
a memory system that is coupled to the processing system and that includes instructions that, when executed by the processing system, cause the processing system to provide a powered device engine that is configured to:
transmit, via a power/data connection, powered device powering information that identifies a plurality of operating modes for a powered device and a respective power amount for each of the plurality of operating modes;
receive, via the power/data connection, a minimum power amount that is associated with a minimum power operation of the plurality of operating modes included in the powered device information;
identify, subsequent to receiving the minimum power amount, a first operating mode that is included in the plurality of operating modes and in which the powered device is currently operating;
determine a first power amount that is required to enable the first operating mode in which the powered device is currently operating;
transmit, via a power/data connection to a powering device, a first power amount request message that requests the first power amount; and
receive, from the powering device when the first power amount is identified in the powered device powering information, the first power amount via the power/data connection.

9. The IHS of claim 8, wherein the powered device engine is configured to:
identify a second operating mode to which the powered device has transitioned to from the first operating mode;
determine a second power amount that is required to enable the second operating mode to which the powered device has transitioned to from the first operating mode, wherein the second power amount is different from the first power amount;
transmit, via the power/data connection to the powering device, a second power amount request message that requests the second power amount; and
receive, from the powering device when the second power amount is identified in the powered device powering information, the second power amount via the power/data connection.

10. The IHS of claim 8, wherein the powered device powering information is transmitted prior to identifying the first operating mode in which the powered device is currently operating and subsequent to the powered device being connected to the powering device via the power/data connection, and wherein the powered device powering information includes a second power amount that is required by the powered device for second powered device operations, and a third power amount that is required by the powered device for third powered device operations and that is higher than the second power amount.

11. The IHS of claim 10, wherein the powered device engine is configured, prior to identifying the first operating mode in which the powered device is currently operating, to:
identify, to the powering device via the power/data connection and subsequent to being connected to the powering device via the power/data connection, a powering time period after which the second power amount should be provided via the power/data connection.

12. The IHS of claim 10, wherein the minimum power operation include network connection operations, and wherein the second powered device operations include intermediate operations that utilize less power than maximum power operations that are performed by the powered device and that are provided by the third powered device operations.

13. The IHS of claim 8, wherein the first power amount request message is a Link Layer Discovery Protocol (LLDP) message.

14. A method for adaptive Power over Ethernet (PoE) powering, comprising:
transmitting, by a powered device and via a power/data connection, powered device powering information that identifies a plurality of operating modes for a powered device and a respective power amount for each of the plurality of operating modes;
receiving, by the powered device and via the power/data connection, a minimum power amount that is associated with a minimum power operation of the plurality of operating modes included in the powered device information;
identifying, by the powered device and subsequent to receiving the minimum power amount, a first operating mode that is included in the plurality of operating modes and in which the powered device is currently operating;
determining, by the powered device, a first power amount that is required to enable the first operating mode in which the powered device is currently operating;
transmitting, by the powered device via a power/data connection to a powering device, a first power amount request message that requests the first power amount; and
receiving, by the powered device from the powering device when the first power amount is identified in the powered device powering information by the powering device, the first power amount via the power/data connection.

15. The method of claim 14, further comprising:
identifying, by the powered device, a second operating mode to which the powered device has transitioned to from the first operating mode;
determining, by the powered device, a second power amount that is required to enable the second operating mode to which the powered device has transitioned to from the first operating mode, wherein the second power amount is different from the first power amount;
transmitting, by the powered device via the power/data connection to the powering device, a second power amount request message that requests the second power amount; and
receiving, by the powered device from the powering device when the second power amount is identified in the powered device powering information by the powering device, the second power amount via the power/data connection.

16. The method of claim 14, wherein the powered device powering information is transmitted prior to identifying the first operating mode in which the powered device is currently operating to the powering device, and subsequent to the powered device being connected to the powering device via the power/data connection, and wherein the powered device powering information includes:
a second power amount that is required by the powered device for second powered device operations; and
a third power amount that is required by the powered device for third powered device operations and that is higher than the second power amount.

17. The method of claim 14, further comprising:
receiving, by the powering device, the identification of the minimum power amount via the power/data connection from the powered device; and
transmitting, by the powering device prior to receiving the first power amount request message and transmitting the first power amount via the power/data connection to the powered device, the minimum power amount via the power/data connection to the powered device to allow the powered device to perform the minimum power operations that include network connection operations.

18. The method of claim 14, further comprising:
identifying, by the powered to the powering device prior to identifying the first operating mode in which the powered device is currently operating via the power/data connection and subsequent to being connected to the powering device via the power/data connection, a powering time period.

19. The method of claim 18, further comprising:
receiving, by the powering device, the identification of the powering time period via the power/data connection from the powered device; and
transmitting, by the powering device via the power/data connection to the powered device and in response to determining that the time period has ended, the minimum power amount according to the powered device powering information.

20. The method of claim 14, wherein the first power amount request message is a Link Layer Discovery Protocol (LLDP) message.

\* \* \* \* \*